United States Patent
Kobayashi

[19]

[11] Patent Number: 6,167,221
[45] Date of Patent: Dec. 26, 2000

[54] IMAGE FORMING APPARATUS WITH SEPARATE SUPPORT STRUCTURES FOR IMAGE FORMING PARTS AND FOR OTHER PARTS

[75] Inventor: Kazuhiko Kobayashi, Chigasaki, Japan

[73] Assignee: Ricoh Company, Ltd., Tokyo, Japan

[21] Appl. No.: 09/410,053

[22] Filed: Oct. 1, 1999

[30] Foreign Application Priority Data

Oct. 2, 1998  [JP]  Japan ................................. 10-281187
Sep. 10, 1999  [JP]  Japan ................................. 11-256606

[51] Int. Cl.$^7$ .................................................. G03G 15/00
[52] U.S. Cl. .................................................. 399/107
[58] Field of Search ................................. 399/107, 113, 399/114

[56] References Cited

FOREIGN PATENT DOCUMENTS

| | | |
|---|---|---|
| 6-175419 | 6/1994 | Japan . |
| 6-317953 | 11/1994 | Japan . |
| 8-101546 | 4/1996 | Japan . |
| 8-262827 | 10/1996 | Japan . |
| 9-292815 | 11/1997 | Japan . |
| 10-032661 | 2/1998 | Japan . |
| 10-142875 | 5/1998 | Japan . |

*Primary Examiner*—Quana M. Grainger
*Attorney, Agent, or Firm*—Oblon, Spivak, McClelland, Maier & Neustadt, P.C.

[57] ABSTRACT

An image forming apparatus includes a molded frame 52 as a first structure fixed on a metal base plate 50 and a metal frame 54 as a second structure fixed on the metal base plate 50. The molded frame 52 is disposed in the metal frame 54 so that the molded frame 52 is not directly brought into contact with the metal frame 54. The mold frame 52 supports a plurality of parts which are related to an image forming portion and which are capable of being commonly used for operating the copying function, operating the printing function, and operating the facsimile-function. The metal frame 54 supports the other parts, such as a controlling device, reading device, an outer cover, and other parts. A rail member 60, which supports a sheet-supplying cassette so that the sheet-supplying cassette is freely moved in and out, is positioned with respect to the molded frame 52.

8 Claims, 2 Drawing Sheets

IMAGE FORMING APPARATUS WITH SEPARATE SUPPORT STRUCTURES FOR IMAGE FORMING PARTS AND FOR OTHER PARTS

BACKGROUND OF THE INVENTION

1. Field of the Invention

The present invention relates to an image forming apparatus such as a copying machine, a printer, a facsimile machine or a combination thereof, and so forth, which forms/records an image on a recording member such as a sheet of paper or a card.

2. Description of Related Art

Generally, a conventional image forming apparatus includes a single structure for supporting every main part of the image forming apparatus. In general, such conventional structures can be classified into two categories. One employs a pair of metal side plates facing each other, as disclosed in Japanese Laid-Open Patent Publication Nos. 6-317953 and 8-101546; the other employs a metal frame in which steel members are put together, as disclosed in Japanese Laid-Open Patent Publication No. 6-175419.

The structure which employs the pair of metal side plates has advantages in achieving low-costs, high transportation efficiency of elements, and high accuracy. However, it has shortcomings in heavy weight. Further, its production efficiency is low because the structure designed for one apparatus cannot be generally used for the other kinds of apparatuses.

The structure which employs the metal frame is light in weight and has high rigidity. Because it can be used for different kinds of image forming apparatuses, it provides advantages in achieving high productivity. However, this structure is disadvantageous in costs, transportation efficiency, and accuracy. Further, it requires welding facilities for producing the metal frame.

In the meanwhile, with the recent spread of digital technologies, in particular with the remarkable expansion of personal computers, printers are considerably more common. Further, a copying machine, a printer, and a facsimile machine, which have been produced independently, are now produced with a design by which common parts can be used in producing a variety of product-lines including copying machines, printers, facsimile machines, and so forth.

SUMMARY OF THE INVENTION

Accordingly, the present invention has been made in view of the above-discussed problems and an object of the present invention is to address these and other problems.

Another object of the present invention is to provide a novel image forming apparatus having a structure which can be commonly used for producing a variety of product-lines.

Yet another object of the present invention is to provide a novel image forming apparatus having a lightweight structure.

Still another object of the present invention is to provide a novel image forming apparatus including a structure having high accuracy.

Still another object of the present invention is to provide a novel image forming apparatus including a structure having a high strength.

Still another object of the present invention is to provide a novel image forming apparatus with low production-costs, which can be assembled easily.

According to an embodiment of the present invention, an image forming apparatus includes a plurality of first parts, a first structure for supporting the plurality of first parts, and a second structure for supporting a plurality of second parts other than the plurality of first parts.

The plurality of first parts are a portion or all of a plurality of common parts for operating a copying function, operating a printing function, and operating a facsimile-function.

The first structure may be a molded frame. Further, the second structure may be a metal frame.

The molded frame may be disposed in the metal frame.

The image forming apparatus may further include a base plate on which both of the metal frame and the molded frame are disposed.

The image forming apparatus may further include a sheet-supplying cassette and a rail member for supporting the sheet-supplying cassette so that the sheet-supplying cassette is freely moved in and out. The rail member is positioned with respect to the first structure.

The rail member may be assembled so that it is optionally positioned in a direction which is selected from a plurality of prescribed directions.

BRIEF DESCRIPTION OF THE DRAWINGS

A more complete appreciation of the present invention and many of the attendant advantages thereof will be readily obtained as the same becomes better understood by reference to the following detailed description when considered in connection with the accompanying drawings, wherein.

DESCRIPTION OF PREFERRED EMBODIMENTS

Figure 1:
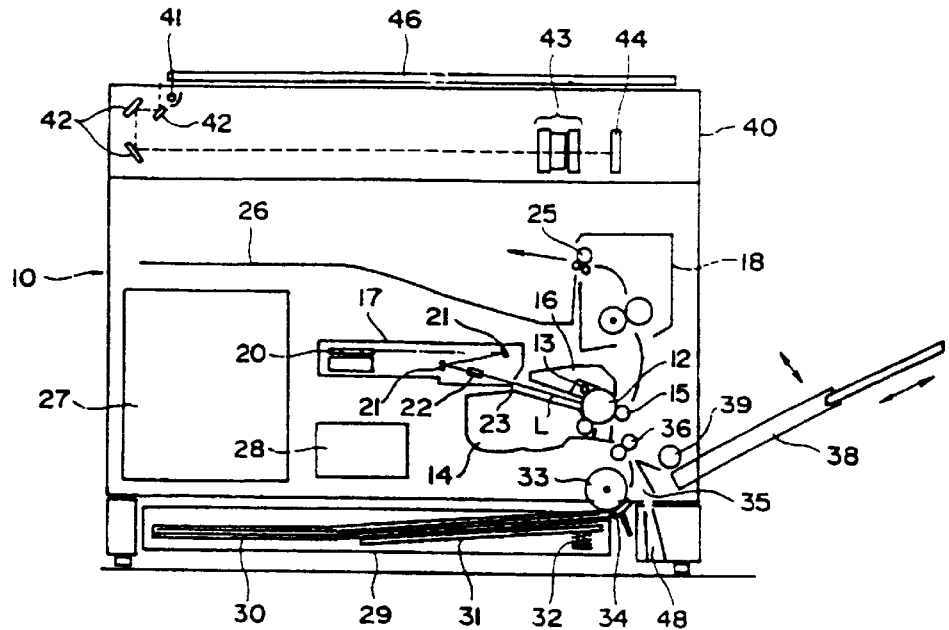
FIG. 1 illustrates an image forming apparatus according to an embodiment of the present invention.

Referring now to the drawings, wherein like reference numerals designate identical or corresponding parts throughout the several views, preferred embodiments of the present invention are now explained.

FIG. 1 illustrates an image forming apparatus according to an embodiment of the present invention, which performs functions of copying an image of an original document, printing an image which is processed or displayed by a computer system, and transmitting/receiving image information between remote apparatuses such as facsimile machines.

Reference numeral 10 designates a main body 10 of the image forming apparatus. A drum-like photo conductor 12 as an image bearing member is provided in the main body 10 and is rotated in a counter-clockwise direction in FIG. 1.

Around the photo conductor 12, a roll-type charging device 13, a developing device 14, a roll-type transferring device 15, cleaning device 16, etc., are serially arranged along the rotational direction of the photo conductor 12, where the roll-type charging device 13 is disposed near a diagonal upper portion of the photo conductor 12. An exposing device 17 is disposed near a side of the cleaning device 16 and in a diagonal upward direction from the developing device 14. Further, a fixing device 18 is provided above the cleaning device 16.

A laser diode (not shown) of the exposing device 17 emits a laser beam. The laser beam is deflected by a polygonal mirror 20, is reflected by a pair of mirrors 21, and is then projected externally of the exposing device 17 through a lens 22 via a projection aperture 23.

A sheet-discharging device 25 is provided in an outlet of a fixing device 18. An internal discharged sheet receiving portion 26 is provided beside the sheet discharging device 25. The discharged sheet receiving portion 26 can accommodate discharged sheets on which images are respectively formed by the functions of the image forming apparatus. A control device 27 is provided below the internal discharged sheet receiving portion 26 and beside the exposing device 17. The control device 27 includes an electric circuit board for controlling a copying operation, a printing operation and a facsimile-operation. An electric equipment device 28 is provided below the exposing device 17 and beside the control device 27.

A sheet-supplying cassette 29 is provided below the main body 10 so as to be freely moved in and out of the main body 10. Sheets of paper 30 as recording media are accommodated on a bottom plate 31 of the cassette. The bottom plate 31 is turned by a force of a spring 32 so that the front edge of the top sheet 30 abuts on a sheet-supplying roller 33.

The sheet-supplying roller 33 is pushed against a separation pad 34. A sheet-supplying path 35 is provided from a portion between the sheet-supplying roller 33 and the separation pad 34 toward a portion between the photo conductor 12 and the transferring device 15. A pair of registration rollers 36 is provided in the sheet-supplying path 35.

A manual sheet-supplying tray 38 is provided in the right side of the main body 10 so as to be freely opened and closed by right and left movement. In a manual sheet supply mode, the manual sheet-supplying tray 38 is opened and a sheet or sheets are accommodated on the manual sheet-supplying tray 38. A manual sheet-supplying roller 39 is rotated so that a sheet is introduced to the pair of registration rollers 36.

Further, a reading device 40 is provided on the main body 10. The reading device 40 includes a light source 41, a plurality of mirrors 42, a lens unit 43, a charge coupled device (CCD) 44, and so forth. The light source 41 and the plurality of mirrors 42 are disposed on a moving member (not shown).

A contact glass plate 46 is provided on the top surface of the reading device 40. A document cover (not shown) for pressing a document against the contact glass plate 46 is provided so as to be freely opened and closed by up and down movement.

In making a copy using the image forming apparatus, an image of an original which is facing in a downward direction is set on the contact glass plate 46 with the document cover opened, then the document cover is closed so that the original is pressed from the top. Then, a start switch disposed in an operation panel of the main body 10 is pressed. The original may be manually set on the contact glass plate 46. Alternatively, an auto document feeding device may be employed for automatically feeding original documents to the contact glass plate 46.

When a start switch is pressed, the moving member moves back and forth along the contact glass plate 46, in order to scan a surface to be read. A light beam emitted from the light source 41 is projected onto the surface to be read so that the light beam is reflected by the surface. The reflected light beam is further reflected by the plurality of mirrors 42, and is then projected onto the charge coupled device 44 through the lens 43. The charge coupled device 44 converts signals of the light beam to electric signals. Accordingly, image information of the original is read by the reading device 40 and is processed by digital image processing.

Further, when the start switch is pressed, the photo conductor 12 rotates in a counter-clockwise direction. Then, the surface of the rotating photo conductor 12 is charged uniformly by the charging device 13. Next, the laser diode emits a laser beam on the basis of the image information which is read by the reading device 40. The surface of the photo conductor 12 is irradiated with the laser beam from the exposing device 17 so that an electrostatic latent image is formed thereon.

Then, the latent image which is carried with the rotation of the photo conductor 12 is developed with toner so that a visible toner image corresponding to the read image is formed on the photo conductor 12.

Furthermore, when the start switch is pressed, the sheet-supplying roller 33 is rotated. A sheet 30 in the sheet-supplying cassette 29, which is individually separated by the separation pad 34, is forwarded to the sheet-supplying path 35. Then, the sheet 30 stops at the pair of registration rollers 36 after abutting thereon.

When a sheet is manually employed for copying, the sheet is set on the manual sheet-supplying tray 38. Then, the sheet is forwarded into the main body 10 with the rotation of the manual sheet-supplying roller 39, which starts when the start switch is pressed. The sheet also stops in the pair of registration rollers 36 after abutting thereon.

The pair of registration rollers 36 is rotated with timing synchronized with a movement of the above-mentioned image which is formed on the photo conductor 12. Namely, the sheet 30 is fed to a portion between the photo conductor 12 and the transferring device 15. The image on the photo conductor 12 is transferred to the sheet 30 by the transferring device 15.

The sheet 30 having the transferred image is fed into the fixing device 18 which fixes the transferred image by applying heat and pressure thereto. The sheet 30 on which the image has been fixed is taken out by the sheet-discharging device 25, to be stacked on the inner discharged sheet receiving portion 26 with the image side of the sheet 30 directed downward.

The photo conductor 12, after the image has been transferred therefrom, is cleaned by the cleaning device 16 so that residual toner is removed from the surface of the photo conductor 12. Thereby the cleaned portion of the photo conductor 12 becomes ready for the next image forming process, which starts with the charging process by the charging device.

The main body 10 of the image forming apparatus may be installed on a sheet-supplying table. In this case, a sheet in the sheet-supplying table may be fed into the main body 10. The sheet is introduced to the pair of restoration rollers 36. Then, an image is formed on the transfer sheet.

Figure 2:
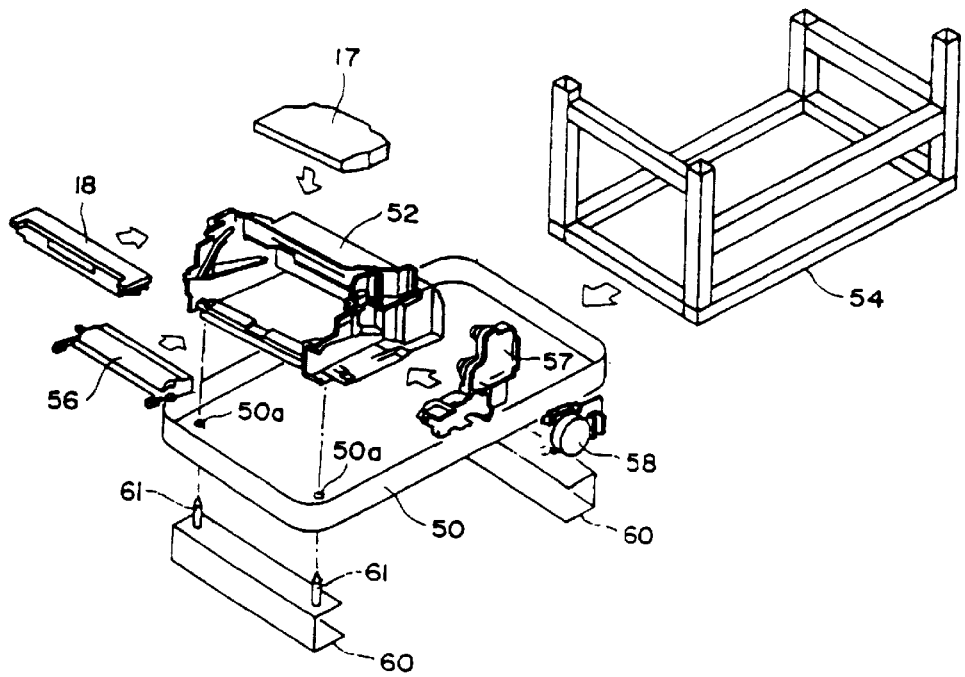
FIG. 2 is an oblique assembly drawing illustrating an inner mechanism of the image forming apparatus of FIG. 1.

FIG. 2 is an oblique assembly drawing illustrating the image forming apparatus of FIG. 1. Reference numeral 50 designates a metal base plate disposed in the bottom of the main body 10. A plastic molded frame 52 as a first structure is directly fixed on the base plate 50 using fastening members such as screws, rivets, and so forth. A metal frame 54 as a second structure is also directly fixed on the base plate 50 using fastening members such as screws, rivets, welding, and so forth. The molded frame 52 is disposed in the metal frame 54 but is not directly brought into contact with the metal frame 54.

The molded frame 52 is formed by a molding method. The molded frame 52 supports a plurality of parts which are mainly related to the image forming operation and which are a portion or all of common parts for a copying operation, a printing operation, and a facsimile-operation. For example, the molded frame 52 supports a process unit 56, the exposing device 17, a drive transmission device 57, a drive source 58, sheet carrying device (not shown) for carrying the sheet 30, and so forth.

The process unit 56 is a unit which includes, for example, the photo conductor 12, the charging device 13, the developing device 14, the cleaning device 16 of FIG. 1. The drive transmission device 57 transmits a driving force from the drive source 58 to driven devices, such as the photo conductor 12, the charging device 13, the developing device 14, the transferring device 15, the cleaning device 16, the fixing device 18 and the sheet carrying device.

In producing the metal frame 54, a plurality of channel members are assembled to form a framework. The metal frame 54 supports the other parts which are not supported by the molded frame 52. Namely, the metal frame 54 mainly supports a plurality of parts which have respective specific functions for a copying operation, a printing operation, or a facsimile-operation. Further, the metal frame 54 may support other parts. For example, the metal frame 54 supports the controlling device 27, the electric equipment device 28, the reading device 40, an outer cover of the main body 10, and a pair of handles for carrying the image forming apparatus.

Further, a pair of rails 60 are provided below the base plate 50. The pair of rails 60 supports the sheet-supplying cassette 29 so that the sheet-supplying cassette 29 is freely moved in and out. The pair of rails 60 are disposed parallel to each other so that openings of the pair of rails 60 are disposed opposite each other. A pair of fixing pins 61 are provided in both ends of the left rail 60 of FIG. 2 so that the rail 60 is accurately positioned. Each fixing pin 61 is engaged in a hole (not shown) of the molded frame 52 through a hole 50a of the base plate 50. Therefore, the left rail 60 is accurately positioned with respect to the molded frame 52.

Using screws, rivets, and so forth (not shown), the left rail 60 of FIG. 2 is fixed to the base plate 50 together with the molded frame 52, or fixed to the base plate 50, separately from the molded frame 52. Without any contact with the molded frame 52, the right rail 60 of FIG. 2 is fixed to the base plate 50 with appropriate positioning, using screws, rivets, and so forth (not shown), utilizing the hole 50b of the base plate 50 or the like.

In the above-explained image forming apparatus, the pair of rails 60 are disposed in the right and left portion of the base plate 50, so that the sheet-supplying cassette 29 is freely moved in and out in a direction perpendicular to the sheet-carrying direction. Alternatively, and shown in FIG. 3, the sheet-supplying cassette 29 may be configured so as to be freely moved in and out in a direction parallel to the sheet-carrying direction. For example, a pair of rails 60A may be employed which has a similar cross section and is longer than the pair of rails 60 of FIG. 2. The pair of rails 60A are arranged so that open sides of the pair of rails 60A are disposed parallel and facing each other.

In this case, a plurality of positioning pins, each in an end of each rail 60A, are engaged in a plurality of positioning holes (not shown) of the molded frame 52 via the plurality of holes 50a formed in base plate 50. The other end of each rail 60A is fixed to the base plate 50 with an appropriate positioning, using screws, rivets, and so forth (not shown), without being brought into contact with the molded frame 52.

In a copying operation, when the front side of the main body is wide, an original document for copying is easily set on the reading device 40. Further, in the copying operation, a large number of copies are frequently formed at once or a large image is also frequently formed. In this case, the large number of discharged sheets or the large sheet must be taken out from the discharged sheet receiving portion 26 below the reading device 40. Therefore, the wide front surface of the main body is also advantageous in taking out the discharged sheet on which the image has been formed.

In contrast, in a printing operation, an original document for copying is not set on a reading device. Further, demands are limited for printing a large image which requires a large sheet such as a sheet of A3 size. Therefore, a narrow front side of a main body is preferred when a layout of the image forming apparatus is taken into account in a limited installation space.

Figure 3:
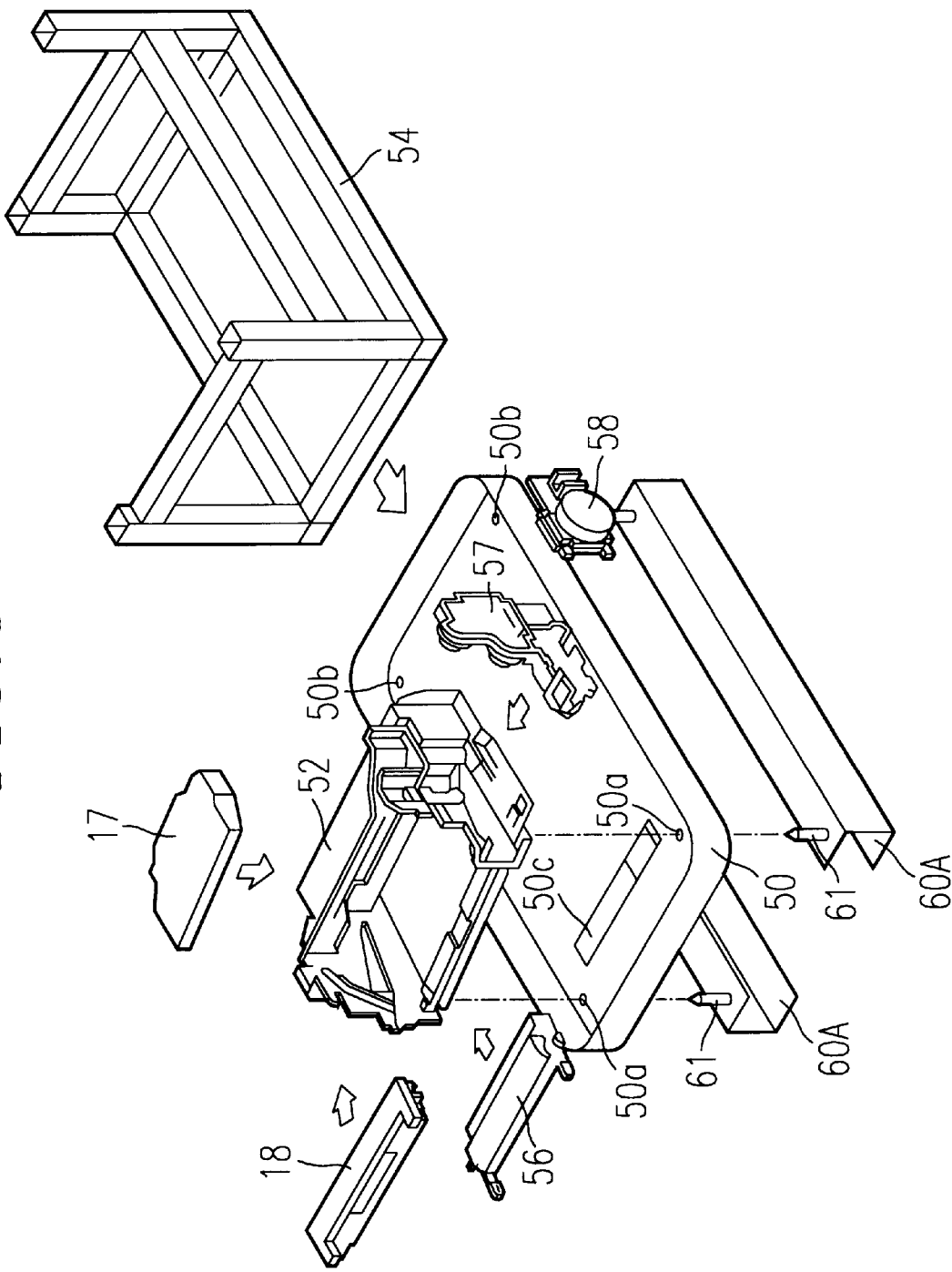
FIG. 3 is an oblique assembly drawing illustrating an inner mechanism of an image forming apparatus according to another embodiment of the present invention, wherein a rail member is assembled in another direction.

In facilitating a sheet-charging operation, the sheet-supplying cassette 29 is generally disposed so as to be freely moved in and out from the front side. Therefore, in assembling the image forming apparatus as described above, the direction of inserting and removing the sheet-supplying cassette with respect to the molded frame is optionally changed in accordance with the side of the molded frame which is selected as the front. For example, as a copying machine, the pair of rails 60 is fixed so that the sheets can be charged from the wide side of the molded frame, as illustrated in FIG. 2. Alternatively, as a printer, the pair of rails 60A may be fixed so that the sheets can be charged from the narrow side of the molded frame, as illustrated in FIG. 3.

In the above-mentioned embodiment, the direction of the pair of rails is selected so as to fit for either a printer or a copying machine. Alternatively, the direction of the rails may be arranged at the user's request. For example, the direction of the pair of rails may be optionally selected so as to fit the user's installation space. Further, the direction of the pair of rails may be optionally selected on the basis of the user's custom.

In the above-mentioned embodiment, the image forming apparatus is capable of performing functions of copying an image of an original document, printing on a sheet an image which is processed or displayed by a computer system, and transmitting/receiving image information between remote apparatuses such as facsimile machines. Alternatively, the present invention may be implemented for a printer, a copying machine, or a facsimile machine.

The above-described embodiments of the present invention have the unprecedented advantages as follows.

(1) An image forming apparatus is provided which includes a first structure and a second structure. The first structure supports a plurality of parts which are a portion or all of a plurality of common parts for operating the copying function, operating the printing function, and operating the facsimile-function. The second structure supports the other parts. Therefore, the first structure and the parts supported by the first structure can be commonly used for producing a copying machine, a printer, a facsimile machine, and a composite machine thereof. Therefore, the same basic structure related to an image forming portion can be employed for a different image forming apparatus. Accordingly, in producing a variety of image forming apparatuses, designing costs are greatly reduced in contrast to a case in which each image forming apparatus is designed independently. Further, the image forming apparatuses can be assembled efficiently. Further, because the first structure can support a basic unit including all parts of the image forming portion which are capable of being commonly used for operating the copying function, operating the printing function, and operating the facsimile-function, the parts can be supported with high accuracy. In particular, positioning errors among the parts can be reduced. Therefore, an image having a high quality is provided.

(2) When the first structure is a plastic molded frame, the image forming apparatus can be produced with low costs and high accuracy. Further, weight of the image forming apparatus is reduced.

(3) When the second structure, which supports other parts such as outer cover and so forth, is a metal frame, the first structure has a high strength against an external force which is applied to the image forming apparatus through the outer cover.

(4) When the molded frame is disposed in the metal frame, a variety of image forming apparatuses including copying machines, printers, and facsimile machines can be produced with high assembling efficiency by employing the metal frames in which parts for a specific operation, for example, a copying operation, a printing operation, or a facsimile-operation are supported.

(5) When both of the metal frame and the molded frame are disposed on a common base plate, an external force for example, a force applied to the metal frame via the outer cover does not reach the molded frame directly. Therefore, deterioration in image quality due to an external force being applied to the image forming apparatus is prevented.

(6) An accuracy of the metal frame may be lower than that of the molded frame because the accuracy of the molded frame is independent from that of the molded frame. Therefore, the metal frame can be produced easily. In other words, in achieving a high image quality, improvement on the accuracy of the structure is mainly focused on the accuracy of the molded frame.

(7) When a rail member for supporting a sheet-supplying cassette is positioned with respect to the first structure, total positioning errors can be reduced. Namely a sheet is accurately supplied for an image forming portion supported by the first structure. Therefore, an image having a high image quality can be formed.

(8) When the rail member is capable of being assembled so that the rail member is optionally positioned in a direction which is selected from a plurality of prescribed directions, a direction of charging sheets into the sheet-supplying cassette is configured so as to fit a user s custom or a space for installing the image forming apparatus, and so forth.

Obviously, numerous modifications and variations of the embodiments disclosed herein are possible in light of the above teachings. It is therefore to be understood that within the scope the appended claims, the invention may be practiced otherwise than as specifically described herein.

This document is based on Japanese Patent Application Nos. 10-281187 filed in the Japanese Patent Office on Oct. 3, 1998, and 11-256606 filed in the Japanese Patent Office on Sep. 10, 1999, the entire contents of which are hereby incorporated by reference.

What is claimed is:

1. An image forming apparatus comprising:
a plurality of first parts;
a first structure for supporting the plurality of first parts; and
a second structure for supporting a plurality of second parts other than the plurality of first parts, wherein the plurality of first parts comprise at least a portion of a plurality of common parts for operating a copying function, operating a printing function, and operating a facsimile-function, wherein the first structure is a molded frame, wherein the second structure is a metal frame, and wherein the molded frame is disposed in the metal frame.

2. The image forming apparatus according to claim 1, further comprising a base plate, wherein both of the metal frame and the molded frame are disposed on the base plate.

3. The image forming apparatus according to claim 1, further comprising mounting elements configured to mount the rail member in any of a plurality of mounting directions.

4. The image forming apparatus according to claim 1, wherein the molded frame is not directly in contact with the metal frame.

5. An image forming apparatus comprising:
a plurality of first parts;
a first structure for supporting the plurality of first parts; and
a second structure for supporting a plurality of second parts other than the plurality of first parts, wherein the plurality of first parts comprise at least a portion of a plurality of common parts for operating a copying function, operating a printing function, and operating a facsimile-function, further comprising a rail member mounted to the first structure and a sheet-supplying cassette freely movably supported by the rail member.

6. The image forming apparatus according to claim 5, further comprising mounting elements configured to mount the rail member in any of a plurality of mounting directions.

7. An image forming apparatus comprising:
a plurality of first parts;
a first structure for supporting the plurality of first parts; and
a second structure for supporting a plurality of second parts other than the plurality of first parts, wherein the plurality of first parts comprise at least a portion of a plurality of common parts for operating a copying function, operating a printing function, and operating a facsimile-function, further comprising a base plate, wherein both of the metal frame and the molded frame are disposed on the base plate, further comprising a rail member mounted to the first structure and a sheet-supplying cassette freely movably supported by the rail member.

8. An image forming apparatus comprising:
a plurality of first parts comprising at least a portion of a plurality of common parts for operating a copying function, operating a printing function, and operating a facsimile-function;
a first structure for supporting the plurality of first parts;
a plurality of second parts; and
means for separately supporting said first parts and said second parts, wherein the second parts do not comprise parts for operating a copying function, operation a printing function, or operation a facsimile-function.

* * * * *